United States Patent
Xie et al.

(10) Patent No.: US 12,276,737 B1
(45) Date of Patent: Apr. 15, 2025

(54) SUPPRESSION METHOD FOR MULTIPATH SIGNAL OF IMAGE MODE BASED ON CORRELATION PEAKS OF SATELLITE BASEBAND SIGNAL

(71) Applicant: Guangdong University of Technology, Guangdong (CN)

(72) Inventors: Shengli Xie, Guangdong (CN); Zhenni Li, Guangdong (CN); Kungan Zeng, Guangdong (CN); Rong Yuan, Guangdong (CN); Kan Xie, Guangdong (CN); Jianhao Tang, Guangdong (CN); Mingwei Wang, Guangdong (CN); Victor Fedorovich Kuzin, Moscow (RU)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/984,945

(22) Filed: Dec. 17, 2024

(30) Foreign Application Priority Data

Jul. 18, 2024 (CN) .......................... 202410961649.3

(51) Int. Cl.
  *G01S 19/22* (2010.01)
(52) U.S. Cl.
  CPC .................... *G01S 19/22* (2013.01)
(58) Field of Classification Search
  CPC ....................................................... G01S 19/22
  See application file for complete search history.

(56) References Cited

U.S. PATENT DOCUMENTS

2024/0219578 A1* 7/2024 Xie .......................... G01S 19/22

FOREIGN PATENT DOCUMENTS

| CN | 115952407 A | * | 4/2023 | ............. G01S 19/22 |
| CN | 116931025 A | * | 10/2023 | |

OTHER PUBLICATIONS

A Spatiotemporal Information-Driven Cross-Attention Model with Sparse Representation for GNSS NLOS Signal Classification, Kungan Zeng et al., Journal of Latex Class Files, vol. 4, No. 8,p. 1-18; Aug. 31, 2021.

* cited by examiner

*Primary Examiner* — Bernarr E Gregory
*Assistant Examiner* — Fred H Mull (57) ABSTRACT

Disclosed is a suppression method for a multipath signal of an image mode based on correlation peaks of a satellite baseband signal, including the steps of: constructing a real-world direct-multipath two-dimensional color image mode data set; and building a multipath suppression model of a deep learning network based on a long-short term memory (LSTM) and a self-attention mechanism module, and training the model. In the present disclosure, a satellite signal can be quickly captured without losing the sensitivity of the captured signal, and a Beidou satellite baseband signal can be captured from a signal recorded in the real world, which enables the model to learn complex signal patterns, improving the accuracy and robustness of multipath signal suppression in urban complex scenes.

9 Claims, 5 Drawing Sheets

SUPPRESSION METHOD FOR MULTIPATH SIGNAL OF IMAGE MODE BASED ON CORRELATION PEAKS OF SATELLITE BASEBAND SIGNAL

CROSS-REFERENCE TO RELATED APPLICATION

This application claims priority of Chinese Patent Application No. 202410961649.3, filed on Jul. 18, 2024, the entire contents of which are incorporated herein by reference.

TECHNICAL FIELD

The present disclosure relates to the technical field of satellite signal processing, and more particularly to a suppression method for a multipath signal of an image mode based on correlation peaks of a satellite baseband signal.

BACKGROUND

Global navigation satellite systems (GNSSs), such as a global positioning system (GPS), and a beidou navigation satellite system (BDS) play an indispensable role in modern society by providing accurate and powerful position services for intelligent transportation and urban management. The BDS, as a satellite navigation system developed independently in China, has the characteristics of multi-constellation coverage, and adopts a ground-based augmentation system (GBAS) and a satellite-based augmentation system (SBAS), which provides positioning accuracy and reliability far exceeding GPS. However, in complex urban environments, such as urban canyons and overpasses, a GNSS signal is often influenced by environmental factors, resulting in interference. While most interference errors (e.g., atmospheric delays, satellite orbit deviations, and satellite clock errors) can be mitigated by statistical methods or differences, multipath interference remains a challenge for current GNSS systems, introducing unexpected deviations to the GNSS measurements, thereby reducing positioning accuracy.

At present, the processing methods of multipath suppression mainly include hardware and software. Hardware-based methods, such as anti-multipath antenna or improving the hardware performance of a receiver, have no significant effect on the suppression of multipath effects, and the application scenario is limited due to the requirement of hardware modification. Software-based methods, such as sidereal filtering, and multipath semi-sky sphere mapping, have some problems, such as instability or huge amount of calculation, which are difficult to meet the needs of high precision and fast positioning.

With the rapid development of machine learning, GNSS applications are also extending to the field of artificial intelligence to achieve better positioning accuracy through data-driven and model training methods, but there are some limitations. According to the type of input data, at present, these methods mainly include a correlator method and a signal observation method. A signal observation value is used as an input of model training for feature identification, but the number of signal observation value indicators is limited, so it is difficult to directly and comprehensively reflect the signal interference situation. Therefore, the trained model has limited applicability to different scene tasks, and the accuracy and adaptability are poor. There is also a method of using correlator output, but the data set used is from an analog data set, and the model is a traditional convolutional neural network (CNN), such as CNN, AlexNet, and visual geometry group network (VGG). The performance for multipath identification task is not ideal, and the trained model lacks the reliability and robustness.

Therefore, there is an urgent need for a new multipath signal suppression technology for Beidou satellite signals to greatly improve the quality and accuracy of GNSS signal reception in urban high-rise areas.

SUMMARY

In view of the deficiencies of the prior art, the present disclosure provides a suppression method for a multipath signal of an image mode based on correlation peaks of a satellite baseband signal, and the method of the present disclosure can improve the accuracy and robustness of multipath signal identification in urban complex scenes.

The present disclosure provides the following technical solutions. A suppression method for a multipath signal of an image mode based on correlation peaks of a satellite baseband signal includes the steps of:

S1), constructing a real-world direct-multipath two-dimensional color image mode data set, S2), building a multipath suppression model of a deep learning network based on a long-short term memory (LSTM) network and a self-attention mechanism module, and training the model;

S3), inputting the data set in step S1) into the trained multipath suppression model, and extracting a time series feature of the two-dimensional color heatmap through the LSTM network; and extracting a spatial aggregation feature of the two-dimensional color heatmap through the self-attention mechanism module; and S4), fusing the time series feature and the spatial aggregation feature to obtain a fusion feature, and outputting a suppression result of the multipath signal after the fusion feature is processed by a fully connected layer of the model.

Preferably, in step S1), the direct-multipath two-dimensional color image mode data set being constructed, specifically includes the following steps:

S11), receiving a satellite original baseband signal at a current position using a GNSS receiver, and resolving and demodulating the received satellite original signal;

S12), capturing correlation peak values of the resolved and demodulated satellite baseband signal through a correlator to acquire the characterization of a possible multipath signal; and S13), converting correlation peaks characterized by the recorded satellite original signals in a direct scene and a multipath scene into a two-dimensional color heatmap through correlation peak detection, to construct the direct-multipath two-dimensional color image mode data set.

Preferably, in step S11), the resolving the satellite original signal includes:

S111), extracting, according to a configuration file synchronously generated when the satellite original signals are recorded, a quantization bit (QUA), number of channels (CHN) and a sampling rate (SMP) of the satellite original baseband signal;

S112), reading satellite signals of multiple channels of each signal sample into a 64-bit unsigned integer array in a data format of LabSat3W; and S113), reading the binary unsigned integer array in step S112) and performing a bit operation and a masking operation to parse each signal sample into a set of complex numbers, a real part and an imaginary part of the complex number respectively correspond to I and Q components of the signal, original data of each channel being extracted from the signal sample through the bit operation, and data of a specific bit range being extracted from the signal sample through the masking operation.

Preferably, in step S11), the demodulating the satellite original signal includes:

S114), reading a resolved long signal, and dividing the long signal into multi-segments of short signals with a time frame of 1 ms according to the sampling rate SMP and a code frequency and a code length of a ranging code B1I code; and S115), traversing all possible satellites, generating a sinusoidal component and a cosine component of a local carrier signal according to a specific frequency, and performing point multiplication on the 1 ms short signal with the sinusoidal and cosine components to obtain a complete 1 ms satellite baseband signal, and I and Q components of the 1 ms satellite baseband signal being represented as $x_I(t)$ and $x_Q(t)$, by the following formulas:

$$x_I(t)=x(t)\sin(2\pi f_c t)$$

$$x_Q(t)=x(t)\cos(2\lambda f_c t)$$

where x(t) is a short signal of 1 ms, $x(t)=A\cos(2\pi f_c t+\phi)$, A being a signal amplitude, $f_c$ being a carrier frequency, and $\phi$ being a carrier phase.

Preferably, in step S12), the capturing the satellite baseband signal specifically includes the following steps:

S121), combining the I and Q components of the 1 ms satellite baseband signal into a complex signal y(t);

S122), performing Fourier transform on the complex signal y(t) to obtain a frequency domain signal Y(k); and generating a complex conjugate Y(k)* according to the frequency domain signal Y(k);

S123), multiplying 32 frequency components $f_i$ with a center frequency of ±0.5 kHz and the generated ranging code B1I to obtain a Doppler frequency shift step search signal $l_{si}=A_s e^{j2\pi f_i t}$, where $e^{j2\pi f_i t}$ is a radio frequency signal, $A_s$ is an amplitude of a ranging code, and j is an imaginary symbol;

S124), performing Fourier transform on the Doppler frequency shift step search signal $l_{si}$ to obtain a frequency domain search signal $L_{si}(k)$; and performing point multiplication on the frequency domain search signal $L_{si}(k)$ with the complex conjugate Y(k)* to obtain Z(k):

$$Z(k)=Y^*(k)L_{si}(k),\text{ and}$$

S125), performing Fourier inversion on Z(k) to obtain a relevant convolved time-domain value z(t), $$z(t)=\text{IDFT}(z(k))=\text{IDFT}(Y^*(k)L_{si}(k))$$

where Z(k) is a correlation function in a frequency domain, when a correct code phase is reached, an output of correlation convolution reaching a peak value, forming a correlation peak, and a baseband signal of Beidou satellite being accurately captured by searching the correlation peak.

Preferably, after peak detection, one code phase range with a range size of one chip width is defined at a position of correlation to avoid over-passing adjacent peak values; and the second highest correlation peak is searched in the set code phase range within the same frequency channel, and a peak value ratio of the highest peak value to the second highest peak is calculated, the satellite being marked as valid if the ratio exceeds a set threshold.

Preferably, in step S2), the multipath suppression model being trained using a gradient descent algorithm, specifically includes the following steps:

S21), determining the number of neurons $l_1$ in a hidden layer of the LSTM network, a length of a feature vector $l_2$ in the self-attention mechanism module, the number of fully connected layers A after fusion and the number of neurons;

S22) selecting an Adam optimizer with an adaptive learning rate, and dynamically adjusting a learning rate of each parameter by utilizing first moment estimation and second moment estimation of a gradient of the Adam optimizer;

S23) selecting binary cross entropy loss as a loss function of the model for determining the quality of the multipath suppression result, having the following calculation formula:

$$\mathcal{L}_{loss}=-\frac{1}{N}\sum_{i=1}^{N}(y_i\log(p_i)+(1+y_i)\log(1-p_i))$$

where y represents a binary label 0 or 1, and p represents the probability that an output belongs to a y label; and N is the number of samples in a training data set and is used for calculating a mean value of the loss function; and S24), inputting the data set constructed in step S1) into the multipath suppression model for training, setting a total training round of the model as M, solving, during the training, a gradient using a back propagation algorithm to update a weight and a bias of the model, and training the model with supervision by utilizing a multipath signal tag, when an iteration round reaches the maximum, the training being completed, and update formulas of the weight and bias being:

$$w^{k+1}\downarrow w^k-\alpha\nabla\mathcal{L}_{(w)}$$

$$b^{k+1}\downarrow b^k-\alpha\nabla\mathcal{L}_{(b)}$$

where w represents a weight, b represents a bias, and $\alpha$ is a learning rate.

Preferably, in step S3), the extracting a time series feature of the two-dimensional color heatmap through the LSTM network specifically includes:

S311), inputting the two-dimensional color heatmap into the LSTM network, followed by processing by a forgetting gate of the LSTM network:

$$f_t=\sigma(W_f g[h_{t-1},x_t]+b_f)$$

where a is a sigmoid function, $W_f$ represents a weight matrix of the forgetting gate, $b_f$ is a bias of the forgetting gate, $x_t$ is an input of a current network, g represents vector splicing, $h_{t-1}$ is a hidden state at a previous moment, and $f_t$ represents a signal time sequence feature outputted by the forgetting gate;

S312), updating information of a time sequence feature of a satellite-related signal processed by the forgetting gate via an input gate, and utilizing a product of processing information about the sigmoid function and processing information about a tanh function to represent information to be transmitted from a current input $x_t$ to a current unit state $C_t$:

$$i_t=\sigma(W_i g[h_{t-1},x_t]+b_i)\cdot\tanh(W_c g[h_{t-1}f_t]+b_c)$$

where $i_t$ represents an activation value of an input gate, $\sigma$ is a sigmoid function, $W_i$ is a weight matrix of the input gate, $h_{t-1}$ is a hidden state at a previous moment; $b_i$ is a bias amount of the input gate, $W_e$ is a weight matrix for generating a candidate memory unit, $x_t$ is an input at a current moment, and $b_e$ is a bias term of the candidate memory unit;

S313), encoding the processed state information into one fixed sequence output through an output gate, that is, utilizing a product result of the processing information about the sigmoid function and the processing information about the tanh function to determine how much information in the current unit state $C_t$ can be transmitted to an output $h_t$ at the current moment:

$$h_t = \sigma(W_0 \cdot g[h_{t-1}, x_t] + b_0) \cdot \tanh(C_t)$$

where $W_0$ is a weight matrix of the output gate, $b_0$ is a bias amount of the output gate, $h_t$ is a hidden state or the output at the current moment, $x_t$ is an input at the current moment, and $h_{t-1}$ is a hidden state at a previous moment; and S314), performing cyclic update according to a length of time series, to obtain a final output of the LSTM network, namely, the information output at a last moment as the time sequence feature of the satellite-related signal.

Preferably, in step S3), by using the self-attention mechanism module as a spatial feature extractor of a relevant two-dimensional color heatmap, the self-attention mechanism module calculates the correlation between each position of the two-dimensional color heatmap and other positions, and performs weighted summation on features of different positions according to these correlations to aggregate global spatial information, to obtain the spatial aggregation feature of a relevant signal, specifically including:

S321), inputting the two-dimensional color heatmap into the self-attention mechanism module, obtaining a correlation score matrix among various features after processing an inner product of Q and K via a nonlinear activation function, and obtaining an attention map between features of the two-dimensional color heatmap by performing inner product on a result with V, and a calculation formula of the self-attention mechanism module being:

$$\text{Attention}(Q, K, V) = \text{softmax}\left(\frac{QK}{\sqrt{d_k}}\right)V$$

where Q, K and V are projections of X in different directions, $Q=W^Q X$, $K=W^K X$, $V=W^V X$, X is feature information about the two-dimensional color heatmap mapped by the satellite baseband signal, $W^Q$, $W^K$ and $W^V$ are projection weight matrices of query, key and value matrixes, softmax is a nonlinear activation function, and $\overline{d_k}$ is a zoom factor; and S322), performing dimension-raising operation on an output of the self-attention mechanism module using a linear fully connected layer; introducing a Relu activation function layer to perform nonlinearization operation, reducing the obtained result in dimension and projecting the same into a subspace with the same dimension as the original one, and introducing residual connection and layer normalization operation; and performing a global average pooling operation to obtain the spatial aggregation feature.

Preferably, in step S4), the fusion adopts a splicing fusion mode, splicing in the last dimension of the time series feature and the spatial aggregation feature, to cause the fusion feature simultaneously to include spatio-temporal information; and inputting the fusion feature into a fully connected layer including A hidden layers, to cause the time sequence information and the spatial aggregation information to be deeply fused through multiple spatial projections; and Preferably, in step S4), the fusion feature may output a suppression result of a multipath signal of a current satellite after being processed by the fully connected layer and then being processed by the sigmoid activation function.

The present disclosure has the following beneficial effects.

1. In the present disclosure, after a GNSS receiver receives a signal, the satellite signal is captured by a correlator, and the related signal is converted into a two-dimensional color heatmap in a time-frequency domain, so that the satellite signal can be quickly captured without losing the sensitivity of the captured signal, and the Beidou satellite baseband signal can be captured from signals recorded in the real world.

2. The data set of the two-dimensional direct-multipath signal heatmap constructed by the present disclosure is derived from the correlation mapping between the captured satellite baseband signal and the ranging code and contains complete direct-multipath signal information on the premise of not damaging the sensitivity of the captured signal, so that the model can learn complex signal patterns.

3. In the present disclosure, a two-dimensional color heatmap is encoded into a 3D tensor and fed into a multipath suppression model, and the splicing information of the time sequence feature and the spatial aggregation feature of the two-dimensional color heatmap is input into a multi-layer fully connected layer for interactive fusion to promote the suppression of multipath signals, thereby improving the accuracy and robustness of multipath signal suppression in complex urban scenes, and having better performance and higher accuracy compared with the existing model.

DETAILED DESCRIPTION

Implementations of the present disclosure will be further described with reference to the accompanying drawings.

Figure 1:
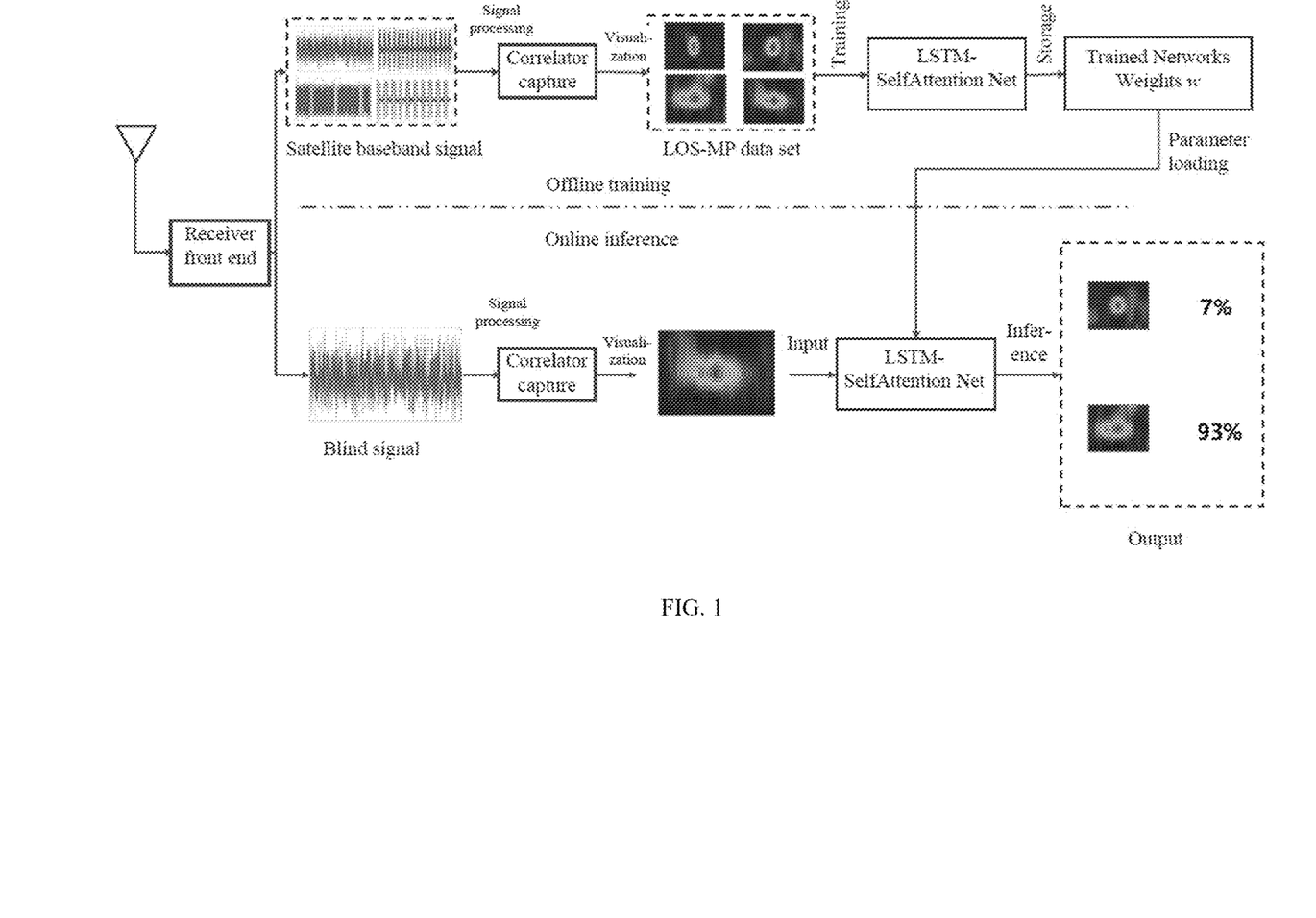
FIG. 1 is a flow frame diagram of a method according to the present disclosure.

As shown in FIG. 1, an example provides a suppression method for a multipath signal of an image mode based on correlation peaks of a satellite baseband signal, including the following steps.

In S1), a real-world direct-multipath two-dimensional color image mode data set is constructed.

Figure 3:
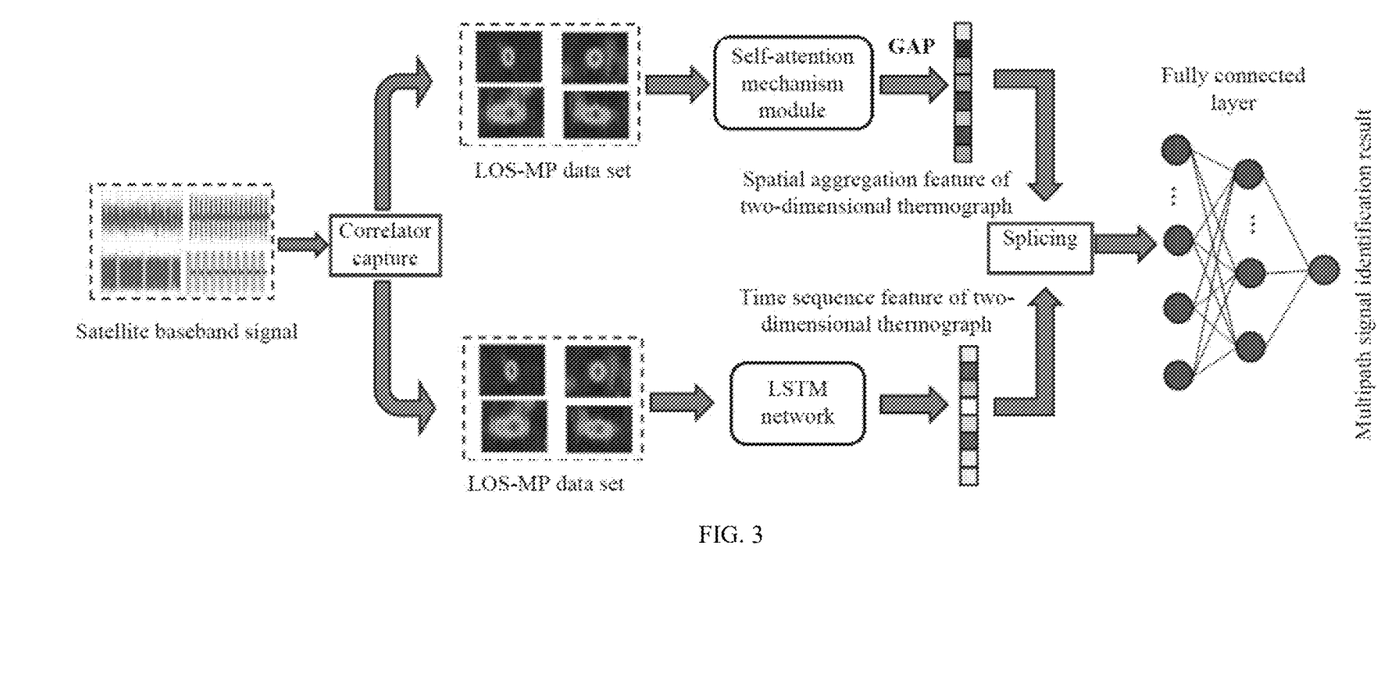
FIG. 3 is a schematic frame diagram of a multipath mitigation model constructed according to the present disclosure.

In S2), a multipath suppression model of a deep learning network is built based on an LSTM network and a self-attention mechanism module, and the model is trained; and the multipath suppression model constructed in the example is shown in FIG. 3.

In S3), the data set in step S1) is inputted into the trained multipath suppression model, and a time series feature of the two-dimensional color heatmap is extracted through the LSTM network; and a spatial aggregation feature of the two-dimensional color heatmap is extracted through the self-attention mechanism module.

In S4), the time series feature and the spatial aggregation feature are fused to obtain a fusion feature, and a suppression result of the multipath signal is outputted after the fusion feature is processed by a fully connected layer of the model.

Figure 2:
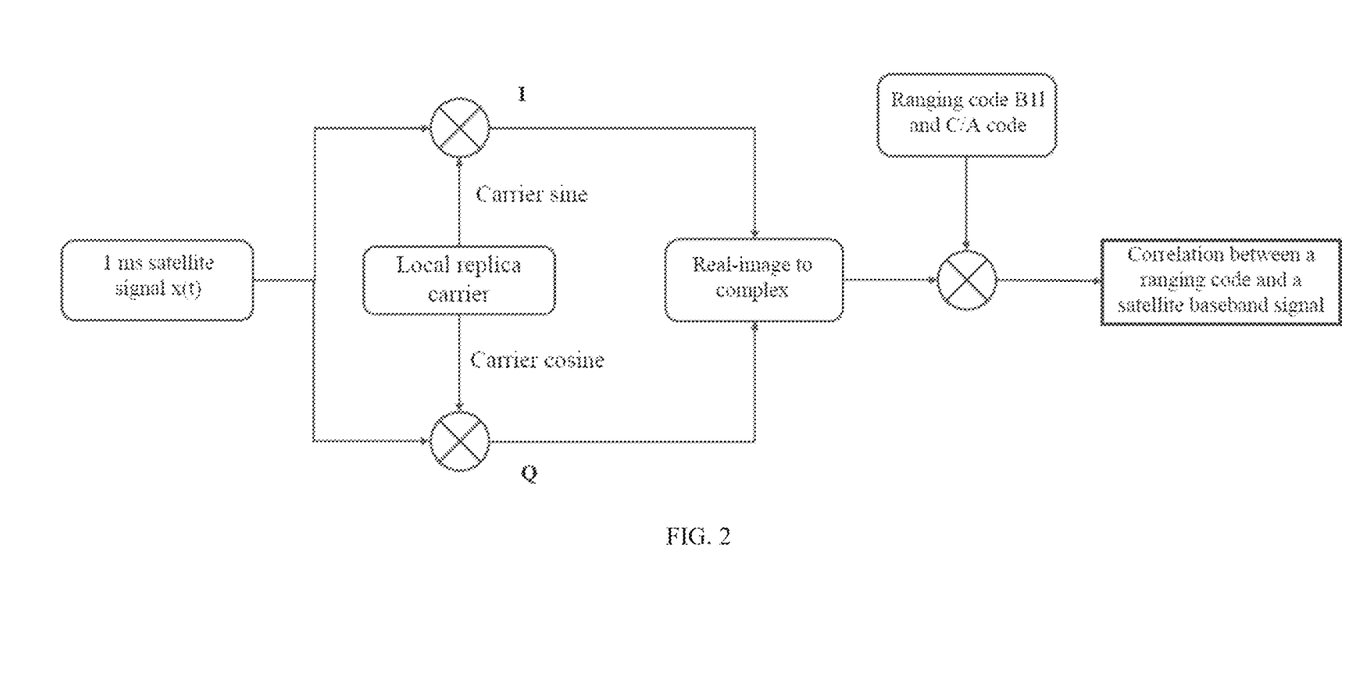
FIG. 2 is a schematic flow diagram of captured correlation peaks according to the present disclosure.

Preferably, in step S1), the direct-multipath two-dimensional color image mode data set being constructed, specifically includes the following steps:

In S11), a satellite original baseband signal is received at a current position using a GNSS receiver, and the received satellite original signal is resolved and demodulated. The GNSS receiver used in the example is a LabSat 3 Wideband; and the GNSS receiver can record the received signal data completely, including the original waveform and features of the signal, and accurately record the slight changes and dynamic characteristics of the signal.

In S12), correlation peak values of the resolved and demodulated satellite signal are captured through a correlator to acquire the characterization of a possible multipath signal.

In S13), correlation peaks characterized by the recorded satellite original signals in a direct scene and a multipath scene are converted into a two-dimensional color heatmap through correlation peak detection, to construct the direct-multipath two-dimensional color image mode data set.

Preferably, in step S11), the satellite original signal being resolved, includes the following steps:

In S111), according to a configuration file synchronously generated when the satellite original signals are recorded, a QUA, CHN and SMP of the satellite original baseband signal are extracted.

In S112), satellite signals of multiple channels of each signal sample are read into a 64-bit unsigned integer array in a data format of LabSat3W.

In S113), the binary unsigned integer array in step S112) is read and a bit operation and a masking operation are performed to parse each signal sample into a set of complex numbers, a real part and an imaginary part of the complex number respectively correspond to I and Q components of the signal, original data of each channel being extracted from the signal sample through the bit operation, and data of a specific bit range being extracted from the signal sample through the masking operation.

Preferably, in step S11), in the example, the resolved satellite data is taken, and the cold start capture of the GNSS receiver is executed. In the example, the Beidou satellite signal is searched from the beginning by using the correlation between the ranging code and the satellite baseband signal without knowing the position and time. In the example, the demodulating the satellite original signal includes that:

In S114), a resolved long signal is read, and the long signal is divided into multi-segments of short signals with a time frame of 1 ms according to the sampling rate SMP and a code frequency and a code length of a C/A code. In the example, since a code frequency of the B1I code is 2.046 Mbps, a length of the B1I code is 2046-chip, and the duration thereof is about 1 ms. The signal length of 1 ms usually matches the length of a complete B1I code, and it can be correlated with a B1I code, so that the structural feature of Beidou satellite signal can be effectively used for signal detection and positioning.

$$samplesPerCode = \text{round}\left(\frac{fs}{\frac{codeFreqBasis}{codelength}}\right) \quad (1)$$

$$signal1 = longsignal(1 : samplesPerCode) \quad (2)$$

$$signal2 = longsignal(samplesPerCode + 1 : 2 * samplesPerCode) \quad (3)$$

$$signal\_n = \quad (4)$$

$$longsignal(n - 1) * samplesPerCode + 1 : n * samplesPerCode)$$

where, fs is a sampling frequency, codeFreqBasic is a code frequency and codeLength is a code length.

In the example, the number of samples required per chip is calculated according to formula (1), and according to Formulas (2) to (4), N=T(ms)/1 ms short signals are created according to the duration of long signals.

In S115), traversing all possible satellites, generating a sinusoidal component and a cosine component of a local carrier signal according to a specific frequency, and performing point multiplication on the 1 ms short signal with the sinusoidal and cosine components to obtain a complete 1 ms satellite baseband signal, I and Q components of the 1 ms satellite baseband signal are represented as $x_I(t)$ and $x_Q(t)$, by the following formulas:

$$x_I(t) = x(t)\sin(2\pi f_c t)$$

$$x_Q(t) = x(t)\cos(2\pi f_c t)$$

where x(t) is a short signal of 1 ms, $x(t) = A\cos(2\pi f_c t + \phi)$, A being a signal amplitude, $f_c$ being a carrier frequency and $\phi$ being a carrier phase.

Preferably, in step S12), the satellite baseband signal being captured, specifically includes the following steps:

In S121), the I and Q components of the 1 ms satellite baseband signal are combined into a complex signal y(t).

In S122), Fourier transform is performed on the complex signal y(t) to obtain a frequency domain signal Y(k); and a complex conjugate Y(k)* is generated according to the frequency domain signal Y(k).

In S123), 32 frequency components $f_i$ are multiplied with a center frequency of 0.5 kHz by the generated ranging code B1I to obtain a Doppler frequency shift step search signal $l_{si} = A_s e^{j2\pi f_i t}$, where $e^{j2\pi f_i t}$ is a radio frequency signal, $A_s$ is an amplitude of a ranging code, and j is an imaginary symbol.

In S124), Fourier transform is performed on the Doppler frequency shift step search signal $l_{si}$ to obtain a frequency domain search signal $L_{si}(k)$; and point multiplication is performed on the frequency domain search signal $L_{si}(k)$ with the complex conjugate Y(k)* to obtain Z(k):

$$Z(k) = Y^*(k)L_{si}(k).$$

In S125), Fourier inversion is performed on Z(k) to obtain a relevant convolved time-domain value z(t), $$z(t) = \text{IDFT}(z(k)) = \text{IDFT}(Y^*(k)L_{si}(k))$$

where Z(k) is a correlation function in a frequency domain, when a correct code phase is reached, an output of correlation convolution reaching a peak value, forming a correlation peak, and a baseband signal of Beidou satellite being accurately captured by searching the correlation peak.

Preferably, after peak detection, one code phase range with a range size of one chip width is defined at a position of correlation to avoid over-passing adjacent peak values; and the second highest correlation peak is searched in the set code phase range within the same frequency channel, and a peak value ratio of the highest peak to the second highest peak is calculated, the satellite being marked as valid if the ratio exceeds a set threshold. In the example, a satellite signal recorded from a GNSS receiver is subjected to signal resolving and demodulation and is captured by a correlator; and a correlated signal is represented in the form of a three-dimensional tensor in a time-frequency domain and is finally converted into a two-dimensional color heatmap. A direct signal and a multipath signal image in the real world are mapped onto the two-dimensional color heatmap in the time-frequency domain without damaging the signal. In addition, each two-dimensional color heatmap is a function of a correlation value with respect to a chip, namely, a function in a time domain, reflecting a time-varying pattern of correlation signal intensity, so that the above-mentioned data set can be seen as a form of time series, the chip axis and a pixel color intensity respectively representing a time dimension and a feature dimension.

Figure 4:
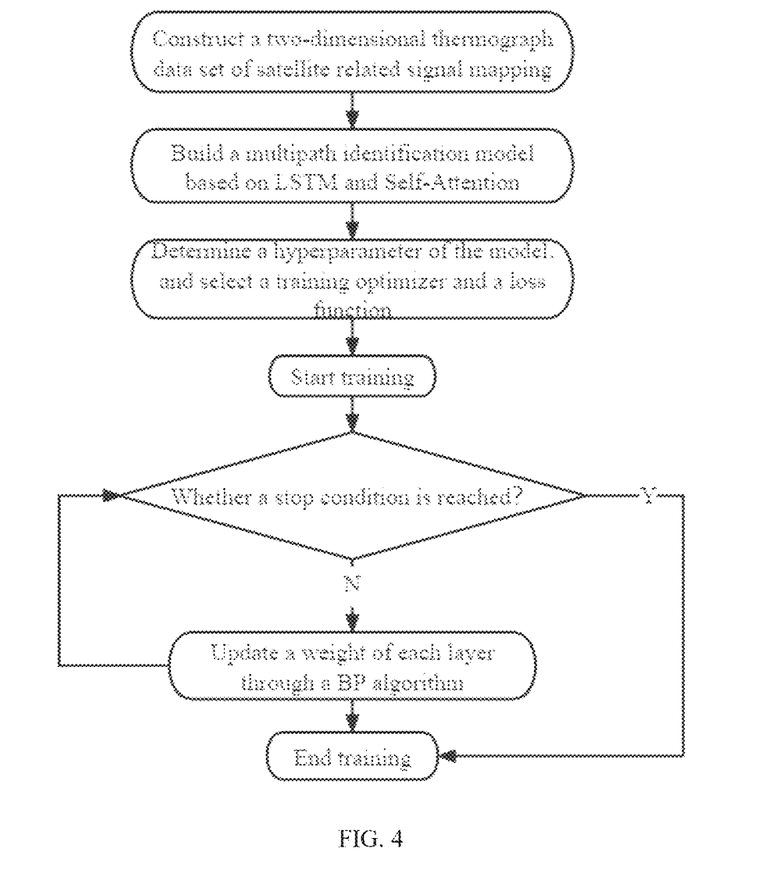
FIG. 4 is a schematic flow diagram of training of the multipath mitigation model according to the present disclosure.

Preferably, in step S2), as shown in FIG. 4, the multipath suppression model being trained using a gradient descent algorithm in the example, specifically includes the following steps:

In S21), the number of neurons $l_1$ in a hidden layer of the LSTM network, a length of a feature vector $l_2$ in the self-attention mechanism module, the number of fully connected layers $\lambda$ are determined after fusion and the number of neurons.

In S22) an Adam optimizer with an adaptive learning rate is selected, and a learning rate of each parameter is dynamically adjusted by utilizing first moment estimation and second moment estimation of a gradient of the Adam optimizer.

In S23) binary cross entropy loss is selected as a loss function of the model for determining the quality of the multipath suppression result, having the following calculation formula:

$$\mathcal{L}_{loss} = -\frac{1}{N}\sum_{i=1}^{N}(y_i \log(p_i) + (1+y_i)\log(1-p_i))$$

where y represents a binary label 0 or 1, and p represents the probability that an output belongs to a y label; and N is the number of samples in a training data set and is used for calculating a mean value of the loss function.

In S24), the data set constructed in step S1) is inputted into the multipath suppression model for training, a total training round of the model is set as M, during the training, a gradient is solved using a back propagation algorithm to update a weight and a bias of the model, and the model is trained with supervision by utilizing a multipath signal tag, when an iteration round reaches the maximum, the training being completed, and update formulas of the weight and bias being:

$$w^{k+1} \leftarrow w^k - \alpha \nabla \mathcal{L}(w)$$

$$b^{k+1} \leftarrow b^k - \alpha \nabla \mathcal{L}(b)$$

where w represents a weight, b represents a bias, and $\alpha$ is a learning rate.

Figure 5:
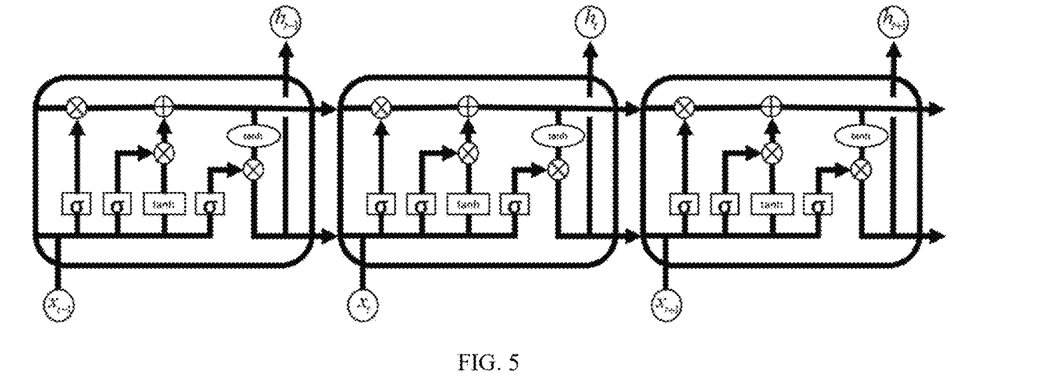
FIG. 5 is a structural diagram of an LSTM network according to the present disclosure.

Preferably, in step S3), in the example, the time series features of the two-dimensional color heatmap are extracted through input, forgetting and output operations via the LSTM network, and the structure diagram of the LSTM network described in the example can be seen from FIG. 5, and specifically includes the following steps:

In S311), the two-dimensional color heatmap is inputted into the LSTM network, followed by processing by a forgetting gate of the LSTM network:

$$f_t = \sigma(W_f \cdot g[h_{t-1}, x_t] + b_f)$$

where $\sigma$ is a sigmoid function, $W_f$ represents a weight matrix of the forgetting gate, $b_f$ is a bias of the forgetting gate, $x_t$ is an input of a current network, g represents vector splicing, $h_{t-1}$ is a hidden state at a previous moment, and $f_t$ represents a signal time sequence feature outputted by the forgetting gate.

In S312), information of a time sequence feature of a satellite-related signal processed by the forgetting gate is updated via an input gate, and a product of processing information about the sigmoid function and processing information about a tanh function is utilized to represent information to be transmitted from a current input $x_t$ to a current unit state $C_t$:

$$i_t = \sigma(W_i \cdot g[h_{t-1}, x_t] + b_i) \cdot \tanh(W_c \cdot g[h_{t-1}, f_t] + b_c)$$

where $i_t$ represents an activation value of an input gate, $\sigma$ is a sigmoid function, $W_i$ is a weight matrix of the input gate, $h_{t-1}$ is a hidden state at a previous moment; $b_i$ is a bias amount of the input gate, $W_c$ is a weight matrix for generating a candidate memory unit, $x_t$ is an input at a current moment, and $b_c$ is a bias term of the candidate memory unit.

In S313), the processed state information is encoded into one fixed sequence output through an output gate, that is, a product result of the processing information about the sigmoid function and the processing information about the tanh function is utilized to determine how much information in the current unit state $C_t$ can be transmitted to an output $h_t$ at the current moment:

$$h_t = \sigma(W_0 \cdot g[h_{t-1}, x_t] + b_0) \cdot \tanh(C_t)$$

where $W_0$ is a weight matrix of an output gate, $b_0$ is a bias amount of the output gate, $h_t$ is a hidden state or output at a current moment, $x_t$ is an input at the current moment, and $h_{t-1}$ is a hidden state at a previous moment.

In S314), cyclic update is performed according to a length of time series, to obtain a final output of the LSTM network, namely, the information output at a last moment as the time sequence feature of the satellite-related signal.

Figure 6:
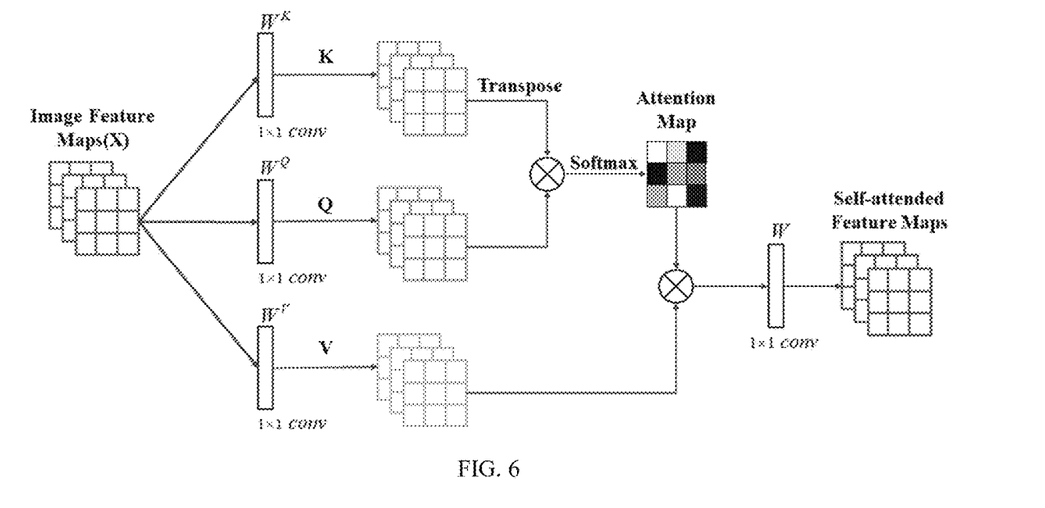
FIG. 6 is a schematic flow diagram of extracting a spatial aggregation feature using a self-attention mechanism module according to the present disclosure.

Preferably, in step S3), in the example, by using the self-attention mechanism module as a spatial feature extractor of a relevant two-dimensional color heatmap, the self-attention mechanism module calculates the correlation between each position of the two-dimensional color heatmap and other positions, and performs weighted summation on features of different positions according to these correlations to aggregate global spatial information, to obtain the spatial aggregation feature of a relevant signal, as shown in FIG. 6, specifically including the following steps:

In S321), the two-dimensional color heatmap is inputted into the self-attention mechanism module, a correlation score matrix is obtained among various features after processing an inner product of Q and K via a nonlinear activation function, and an attention map is obtained between features of the two-dimensional color heatmap by performing inner product on a result with V, a calculation formula of the self-attention mechanism module being:

$$\text{Attention}(Q, K, V) = \text{softmax}\left(\frac{QK}{\sqrt{d_k}}\right)V$$

where Q, K and V are projections of X in different directions, $Q=W^Q X$, $K=W^K X$, $V=W^V X$, X is feature information about the two-dimensional color heatmap mapped by the satellite baseband signal, $W^Q$, $W^K$ and $W^V$ are projection weight matrices of query, key and value matrixes, softmax is a nonlinear activation function, and $\overline{d_k}$ is a zoom factor.

In S322), dimension-raising operation is performed on an output of the self-attention mechanism module using a linear fully connected layer; a Relu activation function layer is introduced to perform nonlinearization operation, the obtained result is reduced in dimension and projected into a subspace with the same dimension as the original one, and residual connection and layer normalization operation are introduced; and a global average pooling operation is performed to obtain the spatial aggregation feature.

Preferably, in step S4), the fusion adopts a splicing fusion mode, splicing in the last dimension of the time series feature and the spatial aggregation feature, to cause the fusion feature simultaneously to contain spatio-temporal information; and inputting the fusion feature into a fully connected layer containing A hidden layers, to cause the time sequence information and the spatial aggregation information to be deeply fused through multiple spatial projections.

Preferably, in step S4), the fusion feature may output a suppression result of a multipath signal of a current satellite after being processed by the fully connected layer and then being processed by the sigmoid activation function.

The above-mentioned examples and descriptions in the specification only illustrate the principle and the best example of the present disclosure. Without departing from the spirit and scope of the present disclosure, there will be various changes and improvements in the present disclosure, which fall within the scope of the claimed disclosure.

The invention claimed is:

1. A suppression method for a multipath signal of an image mode based on correlation peaks of a satellite baseband signal, comprising the steps of:
S1), constructing a real-world direct-multipath two-dimensional color image mode data set, specifically comprising the following steps:
S11), receiving satellite original baseband signals at a current position using a global navigation satellite system (GNSS) receiver, and resolving and demodulating the received satellite original baseband signals;
S12), capturing correlation peak values of the resolved and demodulated satellite baseband signal through a correlator to acquire characterization of a possible multipath signal; and
S13), converting correlation peaks characterized by the recorded satellite original baseband signals in a direct scene and a multipath scene into a two-dimensional color heatmap through correlation peak detection, to construct the direct-multipath two-dimensional color image mode data set;
S2), building a multipath suppression model of a deep learning network based on a long-short term memory (LSTM) network and a self-attention mechanism module, and training the model;
S3), inputting the data set in step S1) into the trained multipath suppression model, and extracting a time series feature of the two-dimensional color heatmap through the LSTM network; and extracting a spatial aggregation feature of the two-dimensional color heatmap through the self-attention mechanism module; and
S4), fusing the time series feature and the spatial aggregation feature to obtain a fusion feature, and outputting a suppression result of the multipath signal after the fusion feature is processed by a fully connected layer of the model.

2. The suppression method for a multipath signal of an image mode based on correlation peaks of a satellite baseband signal according to claim 1, wherein: in step S11), the resolving the satellite original baseband signals comprises:
S111), extracting, according to a configuration file synchronously generated when the satellite original baseband signals are recorded, a quantization bit (QUA), number of channels (CHN) and a sampling rate (SMP) of the satellite original baseband signals;
S112), reading satellite signals of multiple channels of each signal sample into a 64-bit unsigned integer array in a data format of LabSat3W; and
S113), reading the binary unsigned integer array in step S112) and performing a bit operation and a masking operation to parse each signal sample into a set of complex numbers, a real part and an imaginary part of the complex number respectively correspond to I and Q components of the signal, original data of each channel being extracted from the signal sample through the bit operation, and data of a specific bit range being extracted from the signal sample through the masking operation.

3. The suppression method for a multipath signal of an image mode based on correlation peaks of a satellite baseband signal according to claim 1, wherein: in step S11), the demodulating the satellite original baseband signals comprises:
S114), reading a resolved long signal, and dividing the long signal into multi-segments of short signals with a time frame of 1 ms according to the sampling rate SMP and a code frequency and a code length of a ranging code B1I code; and
S115), traversing all possible satellites, generating a sinusoidal component and a cosine component of a local carrier signal according to a specific frequency, and performing point multiplication on the 1 ms short signal with the sinusoidal and cosine components to obtain a complete 1 ms satellite baseband signal, and I and Q components of the 1 ms satellite baseband signal being represented as $x_I(t)$ and $x_Q(t)$, by the following formulas:

$$x_I(t)=x(t)\sin(2\pi f_c t)$$

$$x_Q(t)=x(t)\cos(2\pi f_c t)$$

where x(t) is a short signal of 1 ms, $x(t)=A\cos(2\pi f_c t+\phi)$, A being a signal amplitude, $f_c$ being a carrier frequency, and $\phi$ being a carrier phase.

4. The suppression method for a multipath signal of an image mode based on correlation peaks of a satellite baseband signal according to claim 3, wherein: in step S12), the capturing the satellite baseband signal specifically comprises the following steps:

S121), combining the I and Q components of the 1 ms satellite baseband signal into a complex signal y(t);

S122), performing Fourier transform on the complex signal y(t) to obtain a frequency domain signal Y(k); and generating a complex conjugate Y(k)* according to the frequency domain signal Y(k);

S123), multiplying 32 frequency components $f_i$ with a center frequency of ±0.5 kHz and the generated ranging code B1I to obtain a Doppler frequency shift step search signal $l_{si}=A_s e^{j2\pi f_i t}$, where $e^{j2\pi f_i t}$ is a radio frequency signal, $A_s$ is an amplitude of a ranging code, and j is an imaginary symbol;

S124), performing Fourier transform on the Doppler frequency shift step search signal $l_{si}$ to obtain a frequency domain search signal $L_{si}(k)$; and performing point multiplication on the frequency domain search signal $L_{si}(k)$ with the complex conjugate Y(k)* to obtain Z(k):

$$Z(k)=Y^*(k)L_{si}(k), \text{ and}$$

S125), performing Fourier inversion on Z(k) to obtain a relevant convolved time-domain value z(t), $$z(t)=IDFT(z(k))=IDFT(Y^*(k)L_{si}(k))$$

where Z(k) is a correlation function in a frequency domain, when a correct code phase is reached, an output of correlation convolution reaching a peak value, forming a correlation peak, and a baseband signal of Beidou satellite being accurately captured by searching the correlation peak.

5. The suppression method for a multipath signal of an image mode based on correlation peaks of a satellite baseband signal according to claim 4, wherein: after peak detection, one code phase range with a range size of one chip width is defined at a position of correlation to avoid overpassing adjacent peak values; and the second highest correlation peak value is searched in the set code phase range within the same frequency channel, and a peak value ratio of the highest peak to the second highest peak is calculated, the satellite being marked as valid if the ratio exceeds a set threshold.

6. The suppression method for a multipath signal of an image mode based on correlation peaks of a satellite baseband signal according to claim 1, wherein: in step S2), the multipath suppression model is trained using a gradient descent algorithm, specifically comprising the following steps:

S21), determining the number of neurons $l_1$ in a hidden layer of the LSTM network, a length of a feature vector $l_2$ in the self-attention mechanism module, the number of fully connected layers λ after fusion and the number of neurons;

S22), selecting an Adam optimizer with an adaptive learning rate, and dynamically adjusting a learning rate of each parameter by utilizing first moment estimation and second moment estimation of a gradient of the Adam optimizer;

S23), selecting binary cross entropy loss as a loss function of the model for determining the quality of the multipath suppression result, having the following calculation formula:

$$\mathcal{L}_{loss}=-\frac{1}{N}\sum_{i=1}^{N}(y_i\log(p_i)+(1+y_i)\log(1-p_i))$$

where y represents a binary label 0 or 1, and p represents the probability that an output belongs to a y label; and N is the number of samples in a training data set and is used for calculating a mean value of the loss function; and S24), inputting the data set constructed in step S1) into the multipath suppression model for training, setting a total training round of the model as M, solving, during the training, a gradient using a back propagation algorithm to update a weight and a bias of the model, and training the model with supervision by utilizing a multipath signal tag, when an iteration round reaches the maximum, the training being completed, and update formulas of the weight and bias being:

$$w^{k+1} \downarrow w^k - \alpha \nabla \mathcal{L}(w)$$

$$b^{k+1} \downarrow b^k - \alpha \nabla \mathcal{L}(b)$$

where w represents a weight, b represents a bias, and a is a learning rate.

7. The suppression method for a multipath signal of an image mode based on correlation peaks of a satellite baseband signal according to claim 1, wherein: in step S3), the extracting a time series feature of the two-dimensional color heatmap through the LSTM network specifically comprises:

S311), inputting the two-dimensional color heatmap into the LSTM network, followed by processing by a forgetting gate of the LSTM network:

$$f_t=\sigma(W_f \cdot g[h_{t-1},x_t]+b_f)$$

where σ is a sigmoid function, $W_f$ represents a weight matrix of the forgetting gate, $b_f$ is a bias of the forgetting gate, $x_t$ is an input of a current network, g represents vector splicing, $h_{t-1}$ is a hidden state at a previous moment, and $f_t$ represents a signal time sequence feature outputted by the forgetting gate;

S312), updating information of a time sequence feature of a satellite-related signal processed by the forgetting gate via an input gate, and utilizing a product of processing information about the sigmoid function and processing information about a tanh function to represent information to be transmitted from a current input $x_t$ to a current unit state $C_t$:

$$i_t=\sigma(W_i \cdot g[h_{t-1},x_t]+b_i)\cdot \tanh(W_c \cdot g[h_{t-1},f_t]+b_c)$$

where $i_t$ represents an activation value of an input gate, σ is a sigmoid function, $W_i$ is a weight matrix of the input gate, $h_{t-1}$ is a hidden state at a previous moment; $b_i$ is a bias amount of the input gate, $W_e$ is a weight matrix for generating a candidate memory unit, $x_t$ is an input at a current moment, and $b_e$ is a bias term of the candidate memory unit;

S313), encoding the processed state information into one fixed sequence output through an output gate, that is, utilizing a product result of the processing information about the sigmoid function and the processing information about the tanh function to determine how much information in the current unit state $C_t$ may be transmitted to an output $h_t$ at the current moment:

$$h_t = \sigma(W_0 \cdot g[h_{t-1}, x_t] + b_0) \cdot \tanh(C_t)$$

where $W_0$ is a weight matrix of the output gate, $b_0$ is a bias amount of the output gate, $h_t$ is a hidden state or the output at the current moment, $x_t$ is an input at the current moment, and $h_{t-1}$ is a hidden state at a previous moment; and S314), performing cyclic update according to a length of time series, to obtain a final output of the LSTM network, namely, the information output at a last moment as the time sequence feature of the satellite-related signal.

8. The suppression method for a multipath signal of an image mode based on correlation peaks of a satellite baseband signal according to claim 7, wherein: in step S3), by using the self-attention mechanism module as a spatial feature extractor of a relevant two-dimensional color heatmap, the self-attention mechanism module calculates the correlation between each position of the two-dimensional color heatmap and other positions, and performs weighted summation on features of different positions according to these correlations to aggregate global spatial information, to obtain the spatial aggregation feature of a relevant signal, specifically comprising:

S321), inputting the two-dimensional color heatmap into the self-attention mechanism module, obtaining a correlation score matrix among various features after processing an inner product of Q and K via a nonlinear activation function, and obtaining an attention map between features of the two-dimensional color heatmap by performing inner product on a result with V, a calculation formula of the self-attention mechanism module being:

$$\text{Attention}(Q, K, V) = \text{softmax}\left(\frac{QK}{\sqrt{d_k}}\right)V$$

where Q, K and V are projections of X in different directions, $Q=W^Q X$, $K=W^K X$, $V=W^V X$, X is feature information about the two-dimensional color heatmap mapped by the satellite baseband signal, $W^Q$, $W^K$ and $W^V$ are projection weight matrices of query, key and value matrixes, softmax is a nonlinear activation function, and $\overline{d_k}$ is a zoom factor; and S322), performing dimension-raising operation on an output of the self-attention mechanism module using a linear fully connected layer; introducing a Relu activation function layer to perform nonlinearization operation, reducing the obtained result in dimension and projecting the same into a subspace with the same dimension as the original one, and introducing residual connection and layer normalization operation; and performing a global average pooling operation to obtain the spatial aggregation feature.

9. The suppression method for a multipath signal of an image mode based on correlation peaks of a satellite baseband signal according to claim 1, wherein: in step S4), the fusion adopts a splicing fusion mode, splicing in the last dimension of the time series feature and the spatial aggregation feature, to cause the fusion feature simultaneously to comprise spatio-temporal information; and inputting the fusion feature into a fully connected layer comprising A hidden layers, to cause the time sequence information and the spatial aggregation information to be deeply fused through multiple spatial projections; and the fusion feature may output a suppression result of a multipath signal of a current satellite after being processed by the fully connected layer and then being processed by the sigmoid activation function.

* * * * *